United States Patent
Watanabe et al.

[11] Patent Number: 6,035,267
[45] Date of Patent: Mar. 7, 2000

[54] INTERACTIVE PROCESSING APPARATUS HAVING NATURAL LANGUAGE INTERFACING CAPABILITY, UTILIZING GOAL FRAMES, AND JUDGING ACTION FEASIBILITY

[75] Inventors: Keisuke Watanabe; Akito Nagai, both of Tokyo, Japan

[73] Assignee: Mitsubishi Denki Kabushiki Kaisha, Tokyo, Japan

[21] Appl. No.: 09/043,510

[22] PCT Filed: Sep. 26, 1996

[86] PCT No.: PCT/JP96/02787

§ 371 Date: Mar. 24, 1998

§ 102(e) Date: Mar. 24, 1998

[87] PCT Pub. No.: WO98/13771

PCT Pub. Date: Apr. 2, 1998

[51] Int. Cl.[7] .............................. G06F 17/20; G06F 17/28
[52] U.S. Cl. .................................. 704/1; 704/9; 704/275; 707/2
[58] Field of Search .............................. 704/1, 9, 8, 257, 704/275; 707/2, 3, 1, 6, 104; 706/71, 45

[56] References Cited

U.S. PATENT DOCUMENTS

| | | | |
|---|---|---|---|
| 4,624,008 | 11/1986 | Vensko et al. | 704/253 |
| 4,688,195 | 8/1987 | Thompson et al. | 706/11 |
| 4,829,423 | 5/1989 | Tennant et al. | 704/8 |
| 4,914,590 | 4/1990 | Loatman et al. | 704/8 |
| 5,029,085 | 7/1991 | Ito | 704/9 |
| 5,195,172 | 3/1993 | Elad et al. | 706/62 |
| 5,377,103 | 12/1994 | Lamberti et al. | 704/9 |
| 5,446,891 | 8/1995 | Kaplan et al. | 707/2 |
| 5,812,994 | 9/1998 | Imlah | 706/45 |
| 5,870,701 | 2/1999 | Wachtel | 704/9 |

FOREIGN PATENT DOCUMENTS

| | | |
|---|---|---|
| 40-1048171A | 2/1989 | Japan . |
| 40-3196261A | 8/1991 | Japan . |
| 40-6012445A | 1/1994 | Japan . |
| 40-7210391A | 8/1995 | Japan . |
| 40-7261793A | 10/1995 | Japan . |
| 40-7262190A | 10/1995 | Japan . |

*Primary Examiner*—Joseph Thomas

[57] ABSTRACT

A user goal extracting unit extracts a user goal from an input statement 10 entered by a user. A system goal determining unit 15 determines a system goal in accordance with the user goal. A goal frame generating unit 17 generates a goal frame based on an action sequence knowledge corresponding to the system goal. An action feasibility judging unit 19 sets arguments for, and judges the feasibility of, an action in the goal frame. If the action is judged to be feasible, the action feasibility judging unit 19 outputs an action command to an external application 20. If the action is not judged to be feasible, the action feasibility judging unit 19 outputs a new system goal to the goal frame generating unit 17. The external application 20 outputs a result of execution of the action.

4 Claims, 5 Drawing Sheets

GET_AVALUE: (NAME) TELL ME (ATTRIBUTE NAME)
GET_AVALUE: (NAME) I WANT TO KNOW (ATTRIBUTE NAME)
⋮
GET_AVALUE: (CONDITION) WHAT IS (OBJECT CATEGORY NAME) ?
⋮

[USER GOAL] := GET_AVALUE
 (NAME) := KENCHOJI TEMPLE
 (ATTRIBUTE NAME) := ADMISSION FEE

| SYSTEM GOALS | CORRESPONDING USER GOALS |
|---|---|
| GIVE_AVALUE | GET_AVALUE |
| RETRIEVE_RECORD | GET_RECORD | retrieve_avalue (! ⟨NAME⟩  ! ⟨ATTRIBUTE NAME⟩ ).

inform_illegal( ).

inform_none( ).

inform_avalue( ).

GIVE_AVALUE (retrieve_avalue (ILLEGAL_ATTRIBUTE (inform_illegal))

(NONE (inform_none))

(AVALUE (inform_avalue))

[SYSTEM GOAL] : = GIVE_AVALUE

[CURRENT ACTION]
 : = retrieve_avalue ( ⟨NAME⟩   ⟨ATTRIBUTE NAME⟩ )

FIG.8

U1: HOW MUCH IS THE ADMISSION FEE OF KENCHOJI TEMPLE?

S1: 300 YEN.

U2: WHAT ABOUT ENKAKUJI TEMPLE?

FIG.9

[USER GOAL] : = GET_AVALUE
⟨NAME⟩ : = ENKAKUJI TEMPLE

FIG.10

[USER GOAL] : = GET_AVALUE
⟨NAME⟩ : = ENKAKUJI TEMPLE

⟨ADMISSION FEE⟩ : = 300

[USER GOAL] : = GET_AVALUE
⟨NAME⟩ : = KENCHOJI TEMPLE
⟨ATTRIBUTE NAME⟩ : = ADMISSION FEE

FIG.11

[USER GOAL] : = GET_AVALUE
⟨NAME | 5⟩ : = ENKAKUJI TEMPLE

INTERACTIVE PROCESSING APPARATUS HAVING NATURAL LANGUAGE INTERFACING CAPABILITY, UTILIZING GOAL FRAMES, AND JUDGING ACTION FEASIBILITY

This application is the national phase under 35 U.S.C. § 371 of prior PCT International Application No. PCT/JP96/02787, which has an International filing date of Sept. 26, 1996, which designated the United States of America, the entire contents of which are hereby incorporated by reference.

TECHNICAL FIELD

The present invention relates to an interactive processing apparatus for use in a man-machine interface using natural languages, and more particularly relates to an interactive processing apparatus capable of performing processes utilizing context information thereby allowing users to interact with a system comprising the apparatus with a higher degree of freedom than conventional one.

BACKGROUND ART

With a system having an interactive processing apparatus in a man-machine interface that uses natural language, the user first inputs data to the system. The system responds to the user's input. In reply to responses from the system, the user makes further entries in an interactive manner, until the user achieves a goal. For the user to interact with such an interactive processing apparatus smoothly and efficiently requires that two situations be suitably controlled: a user-initiated situation in which the user takes the initiative in demanding actions of the system, and a system-initiated situation where the system asks questions of the user to solicit responses and information. The requirement is met by use of a man-machine interface capable of controlling interaction with the user by setting appropriate action goals fit for the user's intentions.

Japanese Patent Laid-Open Publication Number JP-A-63/153631, for example, illustratively discloses an interactive processing apparatus for use with the above-described type of man-machine interface using natural language. FIG. 1 is a function block diagram of the disclosed interactive processing apparatus.

In FIG. 1, the reference numeral 1 is an information providing system such as an information retrieval system that retrieves from storage the kind of information that is just fit for the user's needs; 2 is information output by the information providing system 1; 3 is an input statement in natural language entered by a user; 4 is natural language interpreting means for interpreting the meaning of the input statement 3 in natural language; 5 is command generating means for generating commands to the information providing system 1; 6 is topic managing means for extracting objects attracting the user's attention from the information output by the information providing system 1 in response to the command generated from the command generating means 5, the topic managing means further managing the extracted objects to be referenced during the interpretation by the natural language interpreting means 4; and 7 is object storing means for storing the objects currently attracting the user's attention and managed by the topic managing means 6 as well as a history of such objects.

In the conventional interactive processing apparatus outlined above, commands from the information providing system 1 corresponding to input statements 3 in natural language entered by the user allow the user to interact with the system. Where objects attracting the user's attention are extracted and stored in the object storing means 7, any of these objects may be retrieved and used in context analysis. The feature is intended to facilitate making interpretations in the context and minimize interpretive errors, thus rendering interaction smoother.

What characterizes the conventional interactive processing apparatus above is that it has the information providing system 1 generating the commands corresponding to the input statements 3 in natural language entered by the user and that the apparatus simply carries out the commands thus generated. There are no action goals set for the system, and control is not switched from the user-initiated to the system-initiated interactive situation. This results in the inability of the system to maintain smooth interaction if the information for the system to act on is insufficient or if any input statement 3 from the user contains an error.

Natural language input entails frequent uses of abbreviations and referring expressions. To identify what is abbreviated or referred to requires that the user reenter in more specific and substantive terms what is curtailed or referenced. But an interactive session calling on the user frequently to confirm what has already been input does not really amount to an "interaction" with a tolerable degree of freedom. Hence the need for the system to supplement what is abridged or implied in accordance with the context of interaction. What is noticeable here is that abbreviations or referring expressions do not necessary point to any object attracting the user's attention. The substance of abbreviations or references may or many not appear in the immediately preceding speech. There may exist a plurality of supplementary candidates in the context. Furthermore, there are no fixed rules by which to determine one of any number of supplementary candidates; the rules vary dynamically with the interactive situation. This requires controlling two things: determining whether or not to provide supplementation based on context information, and determining the rules by which to select the contents of the supplement if such a supplement is judged to be necessary.

One disadvantage of the conventional interactive processing apparatus disclosed in Japanese Patent Laid-Open Publication Number JP-A-63/153631 is that because the apparatus deals with only the objects attracting the user's attention, it is incapable of supplementing abbreviated conditions, among others, in information retrieval.

The disadvantage above appears to be circumvented illustratively by an interactive processing apparatus disclosed by Japanese Patent Laid-Open Publication Number JP-A-1/222326. This conventional interactive processing apparatus retains history information about input and output statements employed since the beginning of an interactive session. When the intention of an input statement from the user is interpreted by a given set of rules for interpretation, an abbreviation is supplemented by referring to the history information, whereby the user's intention is determined.

One disadvantage of the conventional interactive processing apparatus described above is that in supplementing abbreviations based on the history of interaction, the apparatus is incapable of dynamically varying the rules for selective supplementation depending on the interactive situation.

It is the therefore an object of the present invention to overcome the above and other deficiencies and disadvantages of the prior art and to provide an interactive processing apparatus capable of setting suitable action goals for a system on the basis of a user's intentions, thereby appropriately controlling the initiative of interaction between the user and the system.

It is another object of the present invention to provide an interactive processing apparatus capable of dynamically controlling rules for selecting context information during interaction on the basis of the interactive situation, thereby contextually processing abbreviations or referring expressions that may appear in input statements in natural language entered by the user.

DISCLOSURE OF THE INVENTION

In accordance with a preferred embodiment according to the present invention, an interactive processing apparatus comprises a user goal extracting unit for extracting, from a user-entered input statement in natural language, a user goal expressing the intention of the input statement defined by a user goal knowledge so as to generate a semantic representation of the input statement, an interaction history storage unit for storing the semantic representation of the input statement, a system goal determination unit for determining a system goal corresponding to the user goal defined by a system goal knowledge constituting an action goal of a system, a goal frame generating unit for generating a goal frame made up of the system goal and a system action sequence needed to achieve the system goal defined by an action sequence knowledge, a goal frame storage unit for storing the goal frame thus generated, an action feasibility judging unit for retrieving a semantic representation from the interaction history storage unit in order to set arguments for, and judge feasibility of, the action in the goal frame held by the goal frame storage unit, the action feasibility judging unit generating a new system goal if the action is not judged to be feasible, the action feasibility judging unit outputting an action command if the action is judged to be feasible, the action command being executed by an external application, and a next action determining unit for determining the next action of the system in accordance with the result of the action command execution by the external application. The interactive processing apparatus of the above configuration sets an appropriate action goal of the system based on the user's intentions, thereby suitably controlling the initiative of interactive processing between the user and the system.

In the interactive processing apparatus as another preferred embodiment according to the present invention, the interaction history storage unit may store in a stacked fashion semantic representations of user goals and input statements output by the user goal extracting unit, as well as semantic representations output by the next action determining unit. If there exists an action for which arguments cannot be set because of an incomplete semantic representation in an input statement, the action feasibility judging unit may consecutively retrieve semantic representations stacked in the interaction history storage unit so as to set arguments for the action. This structure makes it possible to supplement referring, pronoun or abbreviated expressions included in the user-entered natural language.

In the interactive processing apparatus as another preferred embodiment according to the present invention, the interaction history storage unit may give a score to each of data items in semantic representations, and the action feasibility judging unit may set arguments for actions in accordance with the scores given to the data items. This structure allows supplementary candidates to be selected dynamically depending on the interactive situation.

In the interactive processing apparatus as another preferred embodiment according to the present invention, the interaction history storage unit may control the scores given to the data items in the semantic representations through the use of a time function. This structure allows rules of selective supplementation to be controlled dynamically depending on the interactive situation.

Other objects, features and advantages of the present invention will become apparent in the following description and appended drawings.

BRIEF DESCRIPTION OF THE DRAWINGS

FIG. 8 is a view of an interaction between a user and an interactive processing apparatus practiced as a second embodiment of the present invention;

FIG. 9 is a view of a user goal and a semantic representation of a speech generated by a user goal generating unit of the second embodiment of the present invention;

FIG. 10 is a view of user goals and semantic representations of speeches which are retained by an interaction history storage unit of the second embodiment;

FIG. 11 is a view of a user goal and a semantic representation of a speech which are generated by a user goal extracting unit of an interactive processing apparatus practiced as a third embodiment of the present invention, the data item in the semantic representation being given a score;

BEST MODE FOR EMBODYING THE INVENTION

The best mode for carrying out the present invention will now be described in detail with reference to the accompanying drawings.

First Embodiment

Figure 2:
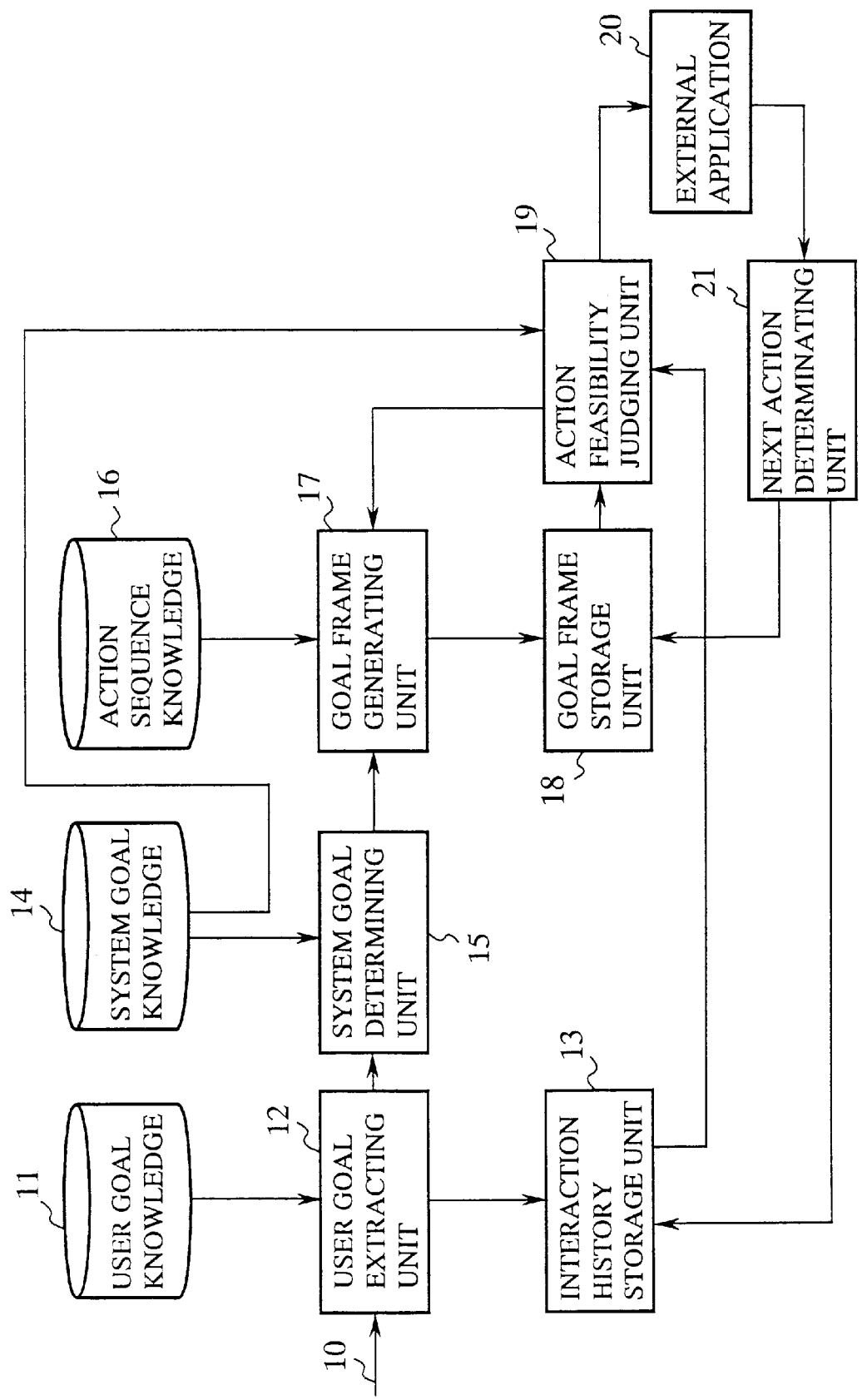
FIG. 2 is a function block diagram of an interactive processing apparatus practiced as a first embodiment of the present invention.

FIG. 2 is a function block diagram of an interactive processing apparatus practiced as the first embodiment of the present invention. In FIG. 2, the reference numeral 10 is an input statement in natural language entered by a user, 11 is a user goal knowledge composed of user goals that define intentions of input statements 10 in natural language, 12 is a user goal extracting unit which refers to the user goal knowledge 11 so as to extract a user goal from the input statement 10 entered by the user, thereby generating a semantic representation of the input statement 10, 13 is an interaction history storage unit which retains user goals and semantic representations from the user goal extracting unit 12, as well as semantic representations coming from a next action determining unit 21 to be described later, 14 is a system goal knowledge that defines system goals constituting action goals of a system, and 15 is a system goal determining unit for determining, from the system goal knowledge 14, a system goal corresponding to the user goal from the user goal extracting unit 12.

The reference numeral 16 is an action sequence knowledge that defines system action sequences needed to achieve system goals, 17 is a goal frame generating unit for retrieving from the action sequence knowledge 16 an action sequence knowledge node corresponding to a system goal which is input either from the system goal determining unit 15 or from an action feasibility judging unit 19 to be defined later, the goal frame generating unit 17 further generating a goal frame pairing the system goal with the corresponding action sequence knowledge node, and 18 is a goal frame storage unit for storing goal frames output by the goal frame generating unit 17.

The reference numeral 19 stands for an action feasibility judging unit for retrieving a semantic representation of a speech from the interaction history storage unit 13 in order to set arguments for, and judge feasibility of, an action in a goal frame being held by the goal frame storage unit 18. The action feasibility judging unit 19 outputs an action command if the action is judged to be feasible, the action feasibility judging unit 19 generates a new system goal if the action is not judged to be feasible, the newly generated system goal being output to the goal frame generating unit 17. The reference numeral 20 indicates an external application driven upon receipt of an action command from the action feasibility judging unit 19, the external application 20 further outputting a result of execution of the action. The reference numeral 21 represents a next action determining unit for determining, in response to the result of action execution output by the external application 20, the action to be executed next in the action sequence of a goal frame being held by the goal frame storage unit 18, the next action determining unit 21 further outputting to the interaction history storage unit 13 a semantic representation acquired from the result of the action execution.

Next, a description will now be given of the operation of the interactive processing apparatus as the first embodiment.

Figures 1, 3, 4, 5:
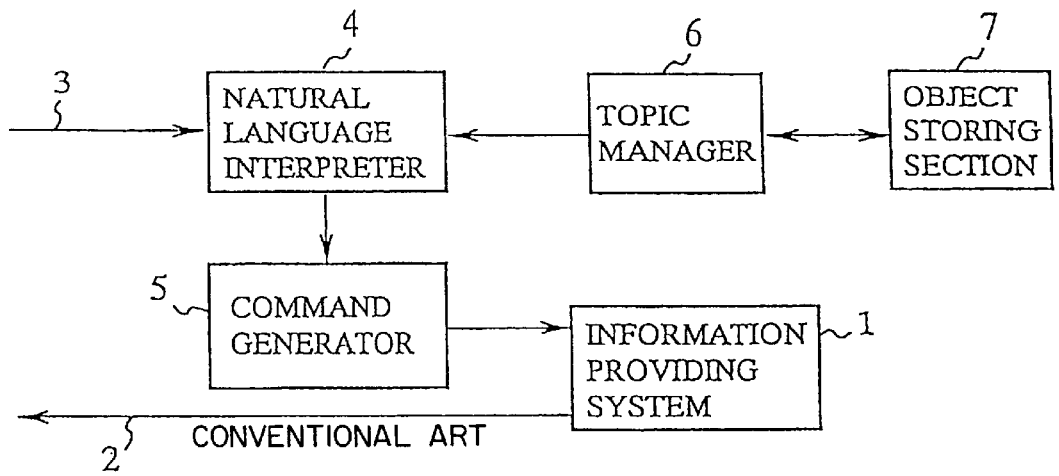
FIG. 1 is a function block diagram of a conventional interactive processing apparatus.
FIG. 3 is a view of a user goal knowledge for use with the first embodiment of the present invention.
FIG. 4 is a view of a user goal and semantic representations of a speech.
FIG. 5 is a view of a system goal knowledge for use with the first embodiment of the present invention.

FIG. 3 is a view showing a typical content of the user goal knowledge 11. In this example, users' speeches such as "Tell me <NAME> <ATTRIBUTE NAME> and "I want to know <NAME> <ATTRIBUTE NAME> are together associated with a user goal "GET_AVALUE" (I want attribute value). The <NAME> and <ATTRIBUTE> are arguments needed to execute a system action, to be described later.

The user goal extracting unit 12 performs syntax analysis on a user's natural language speech entered as an input statement 10, such as "How much is the admission fee of Kenchoji Temple?," and generates accordingly a user goal together with semantic representations of the speech, i.e., [USER GOAL]:=GET_AVALUE, <NAME>:=KENCHOJI TEMPLE, <ATTRIBUTE NAME>:=ADMISSION FEE, as shown in FIG. 3. The user goal and the semantic representations of the speech are sent to the interaction history storage unit 13 for storage therein and are also input to the system goal determining unit 15.

FIG. 5 shows a typical content of the system goal knowledge 14. In this example, the system goal knowledge 14 defines a system goal "GIVE_AVALUE" signifying the action of "presenting the user with an attribute value," and a system goal "RETRIEVE_RECORD" signifying the action of "presenting the user with a record which meets the conditions and which is retrieved from a database." These system goals are associated with user goals "GET_AVALUE" and "GET_RECORD" respectively.

The system goal determining unit 15 determines, based on the system goal knowledge 14, a system goal corresponding to a user goal sent from the user goal extracting unit 12, and outputs the system goal thus determined to the goal frame generating unit 17. Illustratively, if a user goal "GET_AVALUE" is received from the user goal extracting unit 12, the system goal determining unit 15 determines the system goal "GIVE_AVALUE" selectively from the system goal knowledge 14 and outputs the selected system goal.

Figures 6, 7:
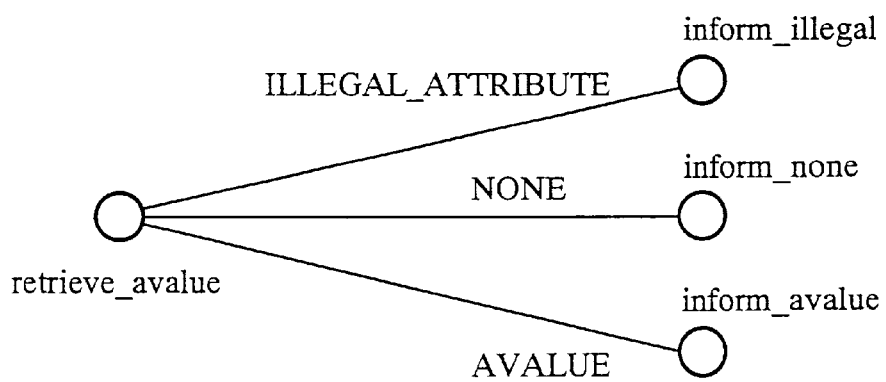
FIG. 6 is a view of an action sequence knowledge for use with the first embodiment of the present invention.
FIG. 7 is a view of a goal frame for use with the first embodiment of the present invention.

FIG. 6 shows a typical content of the action sequence knowledge 16. In this example, lines 1 through 4 declare system actions. Line 1 declares an action having two arguments, <NAME> and <ATTRIBUTE NAME>. Each argument mandatory for execution of the action is defined with a symbol "!" prefixed to the argument name. Line 5 and subsequent lines define a sequence of actions needed to achieve the system goal of, say, "GIVE_AVALUE." In this case, the first action to be started is "retrieve—avalue." If the result of execution of the action is "ILLEGAL_ATTRIBUTE," then the next action is defined as "inform_illegal", if the result is "NONE," the next action is defined as "inform_none, if the result is "AVALUE," the next action is defined as "inform_avalue."

Given a system goal from the system goal determining unit 15, the goal frame generating unit 17 obtains from the action sequence knowledge 16 an action sequence knowledge node corresponding to the system goal so as to generate a goal frame. FIG. 7 depicts a typical goal frame generated by the goal frame generating unit 17 when the latter receives a system goal "GIVE_AVALUE" from the system goal determining unit 15. Action sequence knowledge nodes obtained from the action sequence knowledge 16 constitute a tree structure wherein each branch is labeled with the result of execution of an action. The first node of the tree is established as the action to be processed (hereinafter referred to as the current action).

Goal frames thus generated and output by the goal frame generating unit 17 are retained illustratively in a stacked manner in the goal frame storage unit 18. The first goal frame in the stack (hereinafter referred to as the current goal frame) is processed subsequently.

The action feasibility judging unit 19 retrieves semantic representations of a speech from the interaction history storage unit 13 in order to set arguments for the current action of the current goal frame held by the goal frame storage unit 18. Illustratively, the action feasibility judging unit 19 retrieves the semantic representations in FIG. 4 from the interaction history storage unit 13 so as to set arguments <NAME>:=KENCHOJI TEMPLE and <ATTRIBUTE NAME>: =ADMISSION FEE for the current action "retrieve_avalue" of the goal frame in FIG. 7. The current action is judged to be feasible when all its mandatory arguments have been set. In such a case, the action feasibility judging unit 19 outputs an action command to the external application 20. If not all its mandatory arguments have been set, the action is judged to be unfeasible. In that case, the action feasibility judging unit 19 outputs to the goal frame generating unit 17 a system goal (e.g., "GET_ATTNAME") for which mandatory arguments are to be acquired from the user.

The external application 20 may illustratively be an information retrieval system tapping a database, a hotel reservation system, or a airline ticket reservation system. Given an action command from the action feasibility judging unit 19, the external application 20 executes the action command and outputs the result of the execution. For example, if an action command "retrieve_avalue (KENCHOJI TEMPLE, ADMISSION FEE)" is received from the action feasibility judging unit 19, the external application 20 retrieves applicable data from a tourist information database. If the conditions for data retrieval are not appropriate, the application 20 outputs "ILLEGAL_ATTRIBUTE", if the applicable data is not available, the application 20 outputs "NONE", if the applicable data is obtained, the application 20 outputs "AVALUE." Each output is sent to the next action determining unit 21. The external application 20 may illustratively present the user with the result of data retrieval or the booking status in synthesized voice or in a graphical user interface (GUI) format.

On the basis of the result of command execution from the external application 20, the next action determining unit 21 selects the applicable branch (i.e., next action) of an action sequence knowledge tree in the goal frame storage unit 18, and regards the selected branch as the current action. For example, suppose that an action command Θretrieval_avalue (KENCHOJI TEMPLE, ADMISSION FEE)" is received from the action feasibility judging unit 19 and that the external application 20 outputs the result of command execution "AVALUE: =[<ADMISSION FEE>:=300]. In that case, the next action determining unit 21 outputs to the interaction history storage unit 13 the semantic representation <ADMISSION FEE> contained in the execution result. Furthermore, the next action determining unit 21 selects the branch labeled "AVALUE" on the action knowledge tree in FIG. 7 to determine "informavalue" as the next action and regard it as the current action. If the branch to be selected does not exist on the action knowledge tree of the current goal frame, that means all actions for achieving the current goal frame have been executed. In that case, the current goal frame is removed from the goal frame storage unit 18.

The action feasibility judging unit 19 is activated every time a different current action is set in the goal frame storage unit 18. Thus started, the action feasibility judging unit 19 achieves the system goal determined by the system goal determining unit 15.

As described above, the interactive processing apparatus as the first embodiment of the present invention extracts a user goal from a user's speech, determines a system goal corresponding to the user goal, and executes and achieves a system action sequence applicable to the system goal. If the action cannot be executed, a new system goal is generated and the action corresponding to the new goal is carried out. In this manner, the first embodiment sets appropriate system action goals based on the user's intentions in order to optimally control the initiative of interaction between the user and the system.

Second Embodiment

In the preceding description, the interactive processing apparatus of the first embodiment was shown getting the interaction history storage unit 13 simply to retain user goals together with semantic representations from the user goal extracting unit 12, as well as semantic representations coming from the next action determining unit 21. It was shown that the action feasibility judging unit 19 retrieves semantic representations of the speech from the interaction history storage unit 13 to set arguments necessary for executing the action of the current goal frame held by the goal frame storage unit 18, and that the judging unit 19 judges whether the action is feasible. It was further shown that if the action is feasible, the action feasibility judging unit 19 outputs the action command, and that if the action is not feasible, the action feasibility judging unit 19 generates a new system goal and outputs the goal to the goal frame generating unit 17.

With the second embodiment of the present invention, by contrast, the interaction history storage unit 13 may retain in a stacked fashion user goals together with semantic representations from the user goal extracting unit 12 as well as semantic representations from the next action determining unit 21. Where there is an action for which the action feasibility judging unit 19 cannot set arguments because of an incomplete semantic representation in any input statement, the stacked semantic representations may be retrieved successively from the interaction history storage unit 13 until the necessary arguments are set for the action.

The interactive processing apparatus practiced as the second embodiment of the present invention may have the same configuration as the first embodiment shown in FIG. 2. With the exception of the interaction history storage unit 13 and action feasibility judging unit 19, the user goal knowledge 11, user goal extracting unit 12, system goal knowledge 14, system goal determining unit 15, action sequence knowledge 16, goal frame generating unit 17, goal frame storage unit 18, external application 20, and next action determining unit 21 all work in the same manner as their counterparts of the first embodiment.

Next, a description will now be given of the operation of the interactive processing apparatus as the second embodiment. The ensuing description will center on the workings of the interaction history storage unit 13 and action feasibility judging unit 19.

FIG. 8 shows a typical interaction between a user and the second embodiment of the present invention. As indicated, the input of a user's speech U1, "How much is the admission fee of Kenchoji Temple?" activates the interactive processing apparatus as described in connection with the first embodiment. The external application 20 presents the user with a system response S1, "300 yen" illustratively in synthesized voice. The user's next speech U2, "What about Enkakuji Temple?" causes the user goal extracting unit 12 to generate a user goal and a semantic representation of the speech shown in FIG. 9, i.e., [USER GOAL]:=GET_AVALUE, <NAME>:=ENKAKUJI TEMPLE.

The user goal together with the semantic representation of the user's speech output by the user goal extracting unit 12, i.e., [USER GOAL]:=GET_AVALUE, <NAME>:=ENKAKUJI TEMPLE, and the user goal together with the semantic representations corresponding to the user's speech U1 and system response S1, i.e., [USER GOAL]:=GET_AVALUE, <NAME>: =KENCHOJI TEMPLE, <ATTRIBUTE NAME>:=ADMISSION FEE, <ADMISSION FEE>:=300, are stacked in the interaction history storage unit 13 as shown in FIG. 10.

The system goal determining unit 15, goal frame generating unit 17 and goal frame storage unit 18 work in the same manner as their counterparts of the first embodiment. A typical current goal frame generated by the second embodiment is as shown in FIG. 7.

The action feasibility judging unit 19 retrieves semantic representations of a speech from the interaction history storage unit 13 so as to set arguments for the current action "retrieve_avalue." Here, a mandatory argument <NAME> is set as "ENKAKUJI TEMPLE" based on the first element in the stack of FIG. 10, whereas a mandatory argument <ATTRIBUTE NAME> cannot be set on the basis of the first element in the stack. In that case, the action feasibility judging unit 19 sets the latter argument by successively retrieving stacked elements from the interaction history storage unit 13. As a result, the mandatory argument <ATTRIBUTE NAME> is set as "ADMISSION FEE." When all mandatory arguments have been set in the manner described, the action feasibility judging unit 19 judges that the current action is now feasible, and outputs the appropriate action command to the external application 20.

As described above, the interactive processing apparatus as the second embodiment of the present invention has the interaction history storage unit 13 accommodating in a stacked format user goals together with semantic representations of speeches coming from the user goal extracting unit 12, as well as semantic representations received from the next action determining unit 21. When there is an action for which arguments cannot be set because of an incomplete semantic representation, the action feasibility judging unit 19 retrieves consecutively stacked elements from the interaction history storage unit 13 until all necessary arguments have been set for the action. In this manner, there is the effect to provide the interactive processing apparatus is capable of supplementing, during interaction with a user, referring, pronoun or abbreviated expressions included in natural language speeches entered by the user.

Third Embodiment

The interactive processing apparatus as the second embodiment was shown getting the interaction history storage unit 13 to accommodate in a stacked format user goals together with semantic representations coming from the user goal extracting unit 12, as well as semantic representations received from the next action determining unit 21. It was also shown that where there exists an action for which arguments cannot be set because of an incomplete semantic representation of an input statement, the action feasibility judging unit 19 consecutively retrieves stacked elements from the interaction history storage unit 13 until all necessary arguments have been set for the action. Alternatively, the interaction history storage unit 13 of the third embodiment may give a score to each of the data items in semantic representations, so that the action feasibility judging unit 19 may set arguments for any action in accordance with the score given to each data item.

The interactive processing apparatus practiced as the third embodiment of the present invention may have the same configuration as the first embodiment in FIG. 2. With the exception of the interaction history storage unit 13 and action feasibility judging unit 19, the user goal knowledge 11, user goal extracting unit 12, system goal knowledge 14, system goal determining unit 15, action sequence knowledge 16, goal frame generating unit 17, goal frame storage unit 18, external application 20, and next action determining unit 21 all work in the same manner as their counterparts of the first or second embodiment.

Next, a description will be given of the operation of the interactive processing apparatus as the third embodiment. The ensuing description will center on the workings of the interaction history storage unit 13 and action feasibility judging unit 19.

Upon receipt of a user goal and a semantic representation of a speech such as those in FIG. 9 from the user goal extracting unit 12, the interaction history storage unit 13 gives an initial score to the data in the semantic representation as shown in FIG. 11. For example, <NAME 5> signifies that a score of 5 is given to "<NAME>:= ENKAKUJI TEMPLE." Thereafter, the interaction history storage unit 13 places the user goal and semantic representation into a stack.

The action feasibility judging unit 19 retrieves from the interaction history storage unit 13 semantic representations whose data items are given a score each, and sets arguments for the current action "retrieve_avalue." In that case, the action feasibility judging unit 19 sets arguments only if the score of a given semantic representation exceeds a predetermined threshold value.

Figure 12:
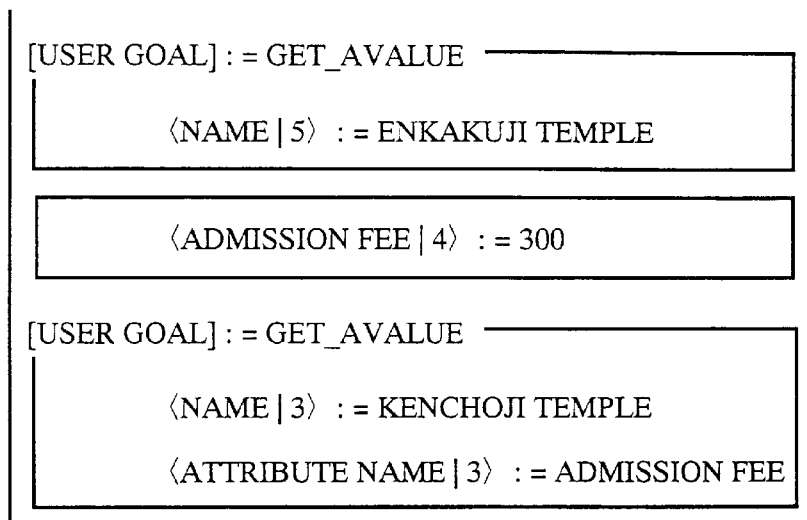
FIG. 12 is a view of user goals and semantic representations of speeches which are retained by an interaction history storage unit of the third embodiment of the present invention.

Suppose that, as shown in FIG. 12, a score of 5 is given to the first element in the stack, <NAME>:=ENKAKUJI TEMPLE, and a score of 3 is given to each of the last elements in the stack, <NAME>:=KENCHOJI TEMPLE and <ATTRIBUTE NAME>: =ADMISSION FEE. If the predetermined threshold value is 3, the arguments for the current action "retrieve_avalue" are set in the same manner as with the second embodiment. If the threshold value is 5, the mandatory argument <NAME> is set in the same manner as the second embodiment but the mandatory argument <ATTRIBUTE NAME> is not set.

The action feasibility judging unit 19 judges an action unfeasible if the action is one for which the mandatory arguments have not all been set. In that case, the action feasibility judging unit 19 outputs to the goal frame generating unit 17 a system goal for acquiring the mandatory arguments from the user, such as "GET_ATTNAME." The score for each semantic representation used in setting the arguments is incremented by a predetermined value. Illustratively, if the element <ATTRIBUTE NAME 3> in the stack in FIG. 12 is used to set an argument, the score for the semantic representation is incremented by 1 (i.e., <ATTRIBUTE NAME 4>).

As described above, the interactive processing apparatus as the third embodiment has the interaction history storage unit 13 giving a score to each of the data items in semantic representations so that the action feasibility judging unit 19 sets arguments for an action in accordance with the score given to each data item. This feature allows the interactive processing apparatus dynamically to select candidates for supplementing incomplete expressions depending on the interactive situation.

Fourth Embodiment

The interactive processing apparatus as the third embodiment described above was shown giving a score to each of data items in semantic representations so that arguments for actions may be set according to the scores. Alternatively, the interactive processing apparatus as the fourth embodiment may use a time function in controlling the scores given to each of the data items in semantic representations. The interactive processing apparatus practiced as the fourth embodiment of the present invention may have the same configuration as the first embodiment shown in FIG. 2. With the exception of the interaction history storage unit 13, the components of the fourth embodiment work in the same manner as their counterparts of the third embodiment.

Next, a description will be given of the operation of the interactive processing apparatus as the fourth embodiment. The ensuing description will center on the workings of the interaction history storage unit 13.

Figure 13:
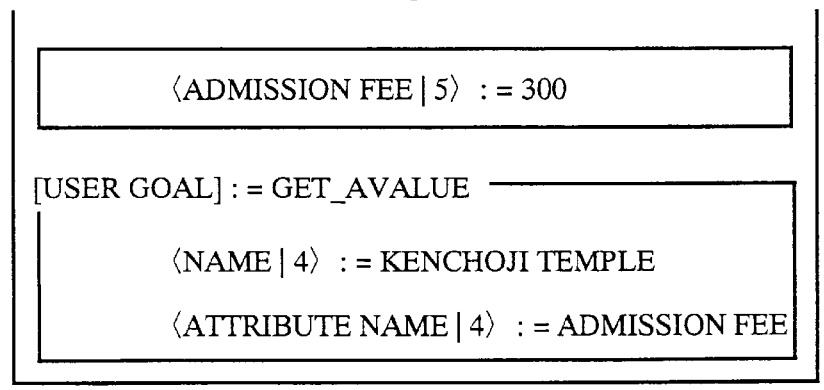
FIG. 13 is a view of a user goal and semantic representations of speeches which are retained by an interaction history storage unit of the third embodiment of the present invention.

Upon receipt of a user goal and a semantic representation of a speech such as those in FIG. 9 from the user goal extracting unit 12, the interaction history storage unit 13 gives an initial score of 5 to the data in the semantic representation as shown in FIG. 11. The user goal and the semantic representation together with the score are placed into a stack. Suppose that, as shown in FIG. 13, the stack already retains semantic representations with scores and 5 and 4, e.g., <ADMISSION FEE 5>:=300, <NAME 4>:= KENCHOJI TEMPLE, and <ATTRIBUTE NAME 4>:= ADMISSION FEE. In such a case, the scores 5 and 4 may be changed by use of a time function. The time function may illustratively be S(n)=1.5n, i.e., a function of the number of times (n) interaction has taken place between the user and the interactive processing apparatus since semantic representations began being placed into the stack.

Figure 14:
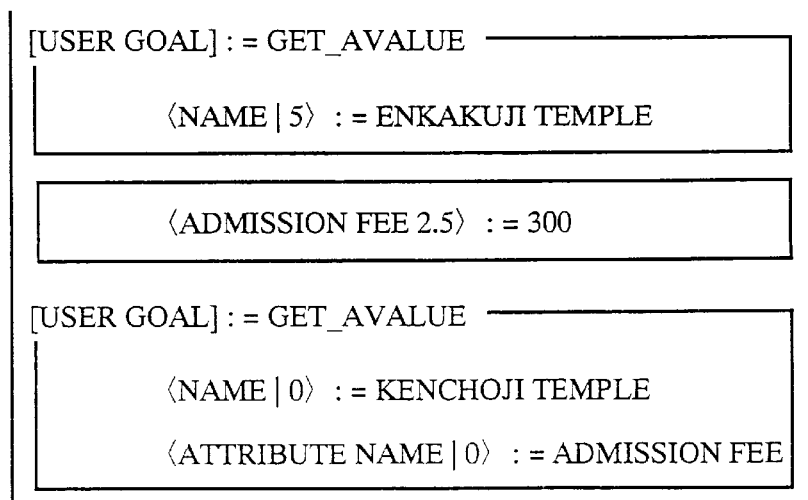
FIG. 14 is a view of user goals and semantic representations of speeches which are retained by an interaction history storage unit of an interactive processing apparatus practiced as a fourth embodiment of the present invention, the interaction history storage unit controlling scores given to the data items in the semantic representations through the use of a time function.

The result is that, as shown in FIG. 14, the semantic representations held in the stack have their scores changed, e.g., <ADMISSION FEE 2.5>:=300, <NAME 0>:= KENCHOJI TEMPLE, and <ATTRIBUTE NAME 0>:= ADMISSION FEE. In addition, a new user goal together with the associated semantic representation, i.e., [USER GOAL]:=GET_AVALUE and <NAME 5>: =ENKAKUJI TEMPLE, is placed into the stack.

As described above, the interactive processing apparatus as the fourth embodiment utilizes a time function in controlling the scores that the interaction history storage unit 13 has given to the data items in semantic representations. This feature allows the interactive processing apparatus dynamically to control the rules of selective supplementation for incomplete expressions depending on the interactive situation.

INDUSTRIAL APPLICABILITY

As described, the interactive processing apparatus according to the present invention is adapted advantageously to a man-machine interface that allows a system to interact repeatedly in natural language with a user, i.e., the system responding to the user's input and the user responding again to the system response, and so on, until the user's goal is achieved. In particular, the inventive interactive processing apparatus sets appropriate actions for the system to perform on the basis of the user's intentions, thus optimally controlling the initiative of interaction between the user and the system. Preferably, the interactive processing apparatus of the present invention may supplement referring, pronoun or abbreviated expressions in natural language statements entered by the user. The inventive interactive processing apparatus may dynamically select candidates for supplementing the user's incomplete expressions depending on the interactive situation. Furthermore, the inventive interactive processing apparatus may control the rules of selective supplementation for incomplete expressions from the user.

We claim:

1. An interactive processing apparatus comprising:
   a user goal extracting unit for referring to a user goal knowledge composed of user goals for defining intentions of input statements in natural language entered by a user, in order to extract a user goal from each input statement, thereby generating a semantic representation of the input statement;
   an interaction history storage unit for storing semantic representations of user goals and input statements output by the user goal extracting unit, as well as semantic representations output by a next action determining unit to be defined later;
   a system goal determining unit for determining a system goal corresponding to a given user goal from a system goal knowledge composed of system goals constituting action goals of a system;
   a goal frame generating unit for retrieving from an action sequence knowledge a system action sequence knowledge node corresponding to a system goal which is input either from the system goal determining unit or from an action feasibility judging unit to be defined later, the sequence knowledge being composed of system action sequence knowledge nodes needed to achieve system goals, the goal frame generating unit further generating a goal frame pairing the system goal with the corresponding system action sequence knowledge node;
   a goal frame storage unit for storing goal frames output by the goal frame generating unit;
   an action feasibility judging unit for retrieving a semantic representation from the interaction history storage unit in order to set arguments for, and judge feasibility of, the action in a goal frame being held by the goal frame storage unit; the action feasibility judging unit outputting an action command if the action is judged to be feasible; the action feasibility judging unit generating a new system goal if the action is not judged to be feasible, the newly generated system goal being output to the goal frame generating unit;
   an external application driven upon receipt of an action command from the action feasibility judging unit, the external application further outputting a result of execution of the action; and
   a next action determining unit for determining, in response to the result of action execution output by the external application, the action to be executed next in the action sequence of a goal frame being held by the goal frame storage unit, the next action determining unit further outputting to the interaction history storage unit a semantic representation acquired from the result of the action execution.

2. An interactive processing apparatus according to claim 1, wherein the interaction history storage unit stores in a stacked fashion semantic representations of user goals and input statements output by the user goal extracting unit, as well as semantic representations output by the next action determining unit; and
   wherein, if there exists an action for which arguments cannot be set because either a referring a pronoun or an abbreviated expression is included in an input statement in natural language entered by a user, the action feasibility judging unit consecutively retrieves semantic representations stacked in the interaction history storage unit so as to set arguments for the action.

3. An interactive processing apparatus according to claim 1, wherein the interaction history storage unit gives a score to each of data items in semantic representations, and
   wherein the action feasibility judging unit sets arguments for actions in accordance with the scores given to the data items.

4. An interactive processing apparatus according to claim 3, wherein the interaction history storage unit controls the scores given to the data items in the semantic representations based on the use of a time function.

* * * * *

UNITED STATES PATENT AND TRADEMARK OFFICE
CERTIFICATE OF CORRECTION

PATENT NO. : 6,035,267
DATED : March 7, 2000
INVENTOR(S) : Watanabe et al.

It is certified that error appears in the above-identified patent and that said Letters Patent is hereby corrected as shown below:

Fig. 14

Change "<ADMISSION FEE 2.5>" to -- <ADMISSION FEE |2.5> --.

Column 7, line 31
    Change "retrieval_" to -- retrieve_ --.
Column 10, line 34
    Change "<ATTRIBUTE NAME 3>" to -- <ATTRIBUTE NAME |3> --.
Column 10, line 37
    Change "<ATTRIBUTE NAME 4>" to -- <ATTRIBUTE NAME |4> --.
Column 11, line 6
    Change "<ADMISSION FEE 5>" to -- <ADMISSION FEE |5> --
Column 11, line 6
    Change "<NAME 4>" to -- <NAME |4> --.
Column 11, line 7
    Change "<ATTRIBUTE NAME 4>" to -- <ATTRIBUTE NAME |4> --.
Column 11, line 16
    Change "<ADMISSION FEE 2.5>" to -- <ADMISSION FEE |2.5> --.
Column 11, line 16
    Change "<NAME 0>" to -- <NAME |0> --.
Column 11, line 17
    Change "<ATTRIBUTE NAME 0>" to -- <ATTRIBUTE NAME |0 --.
Column 11, line 20
    Change "<NAME 5>" to -- <NAME |5> --.

Signed and Sealed this

Seventeenth Day of April, 2001

Attest:

NICHOLAS P. GODICI

Attesting Officer      Acting Director of the United States Patent and Trademark Office